J. E. CONKLIN.
VINE LIFTING ATTACHMENT FOR HARVESTING MACHINES.
APPLICATION FILED JAN. 8, 1919.
1,388,407.
Patented Aug. 23, 1921.
3 SHEETS—SHEET 1.
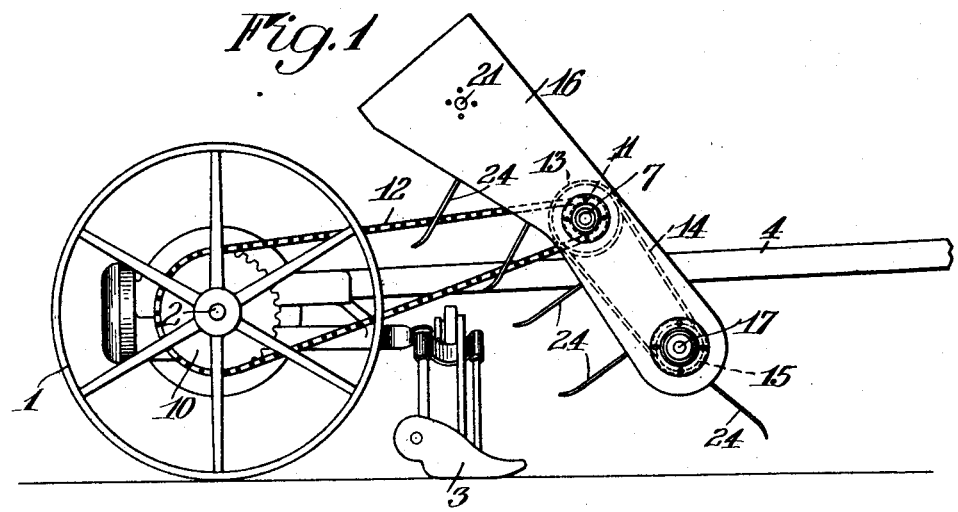
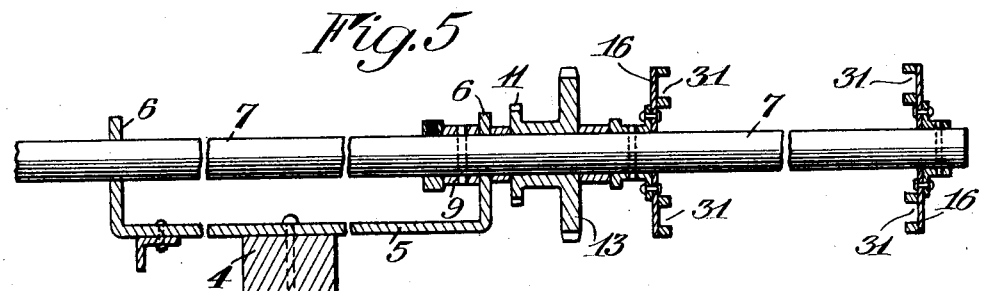
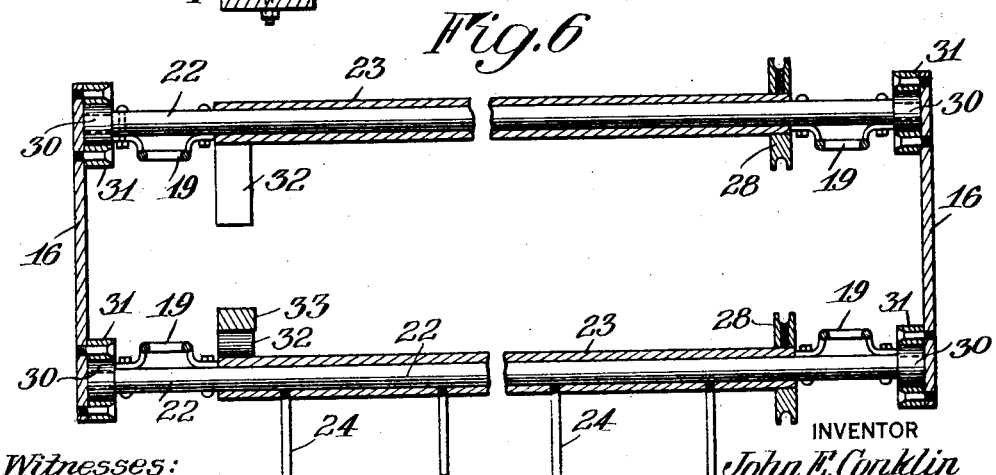
Witnesses:
Nelson H. Copp
INVENTOR
John E. Conklin
BY
his ATTORNEYS

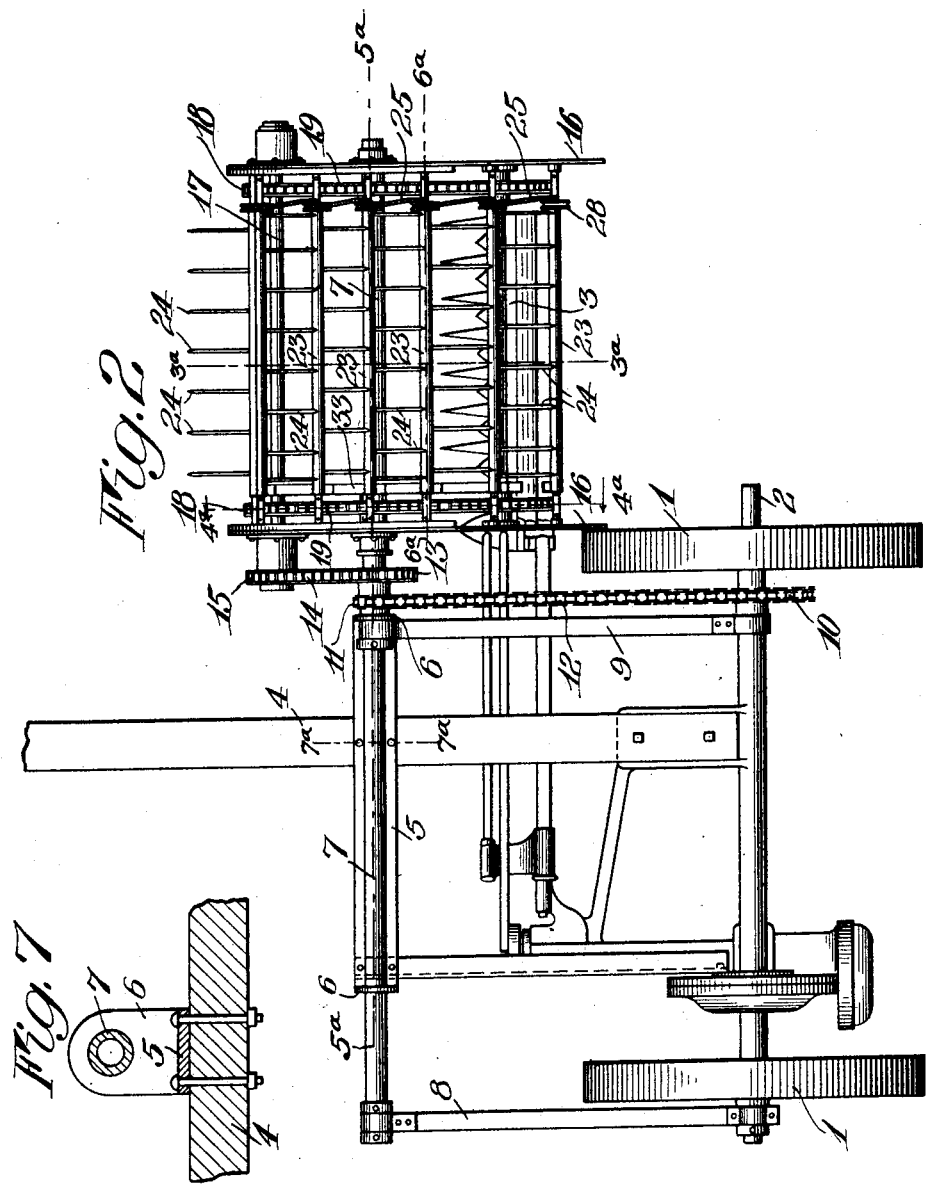

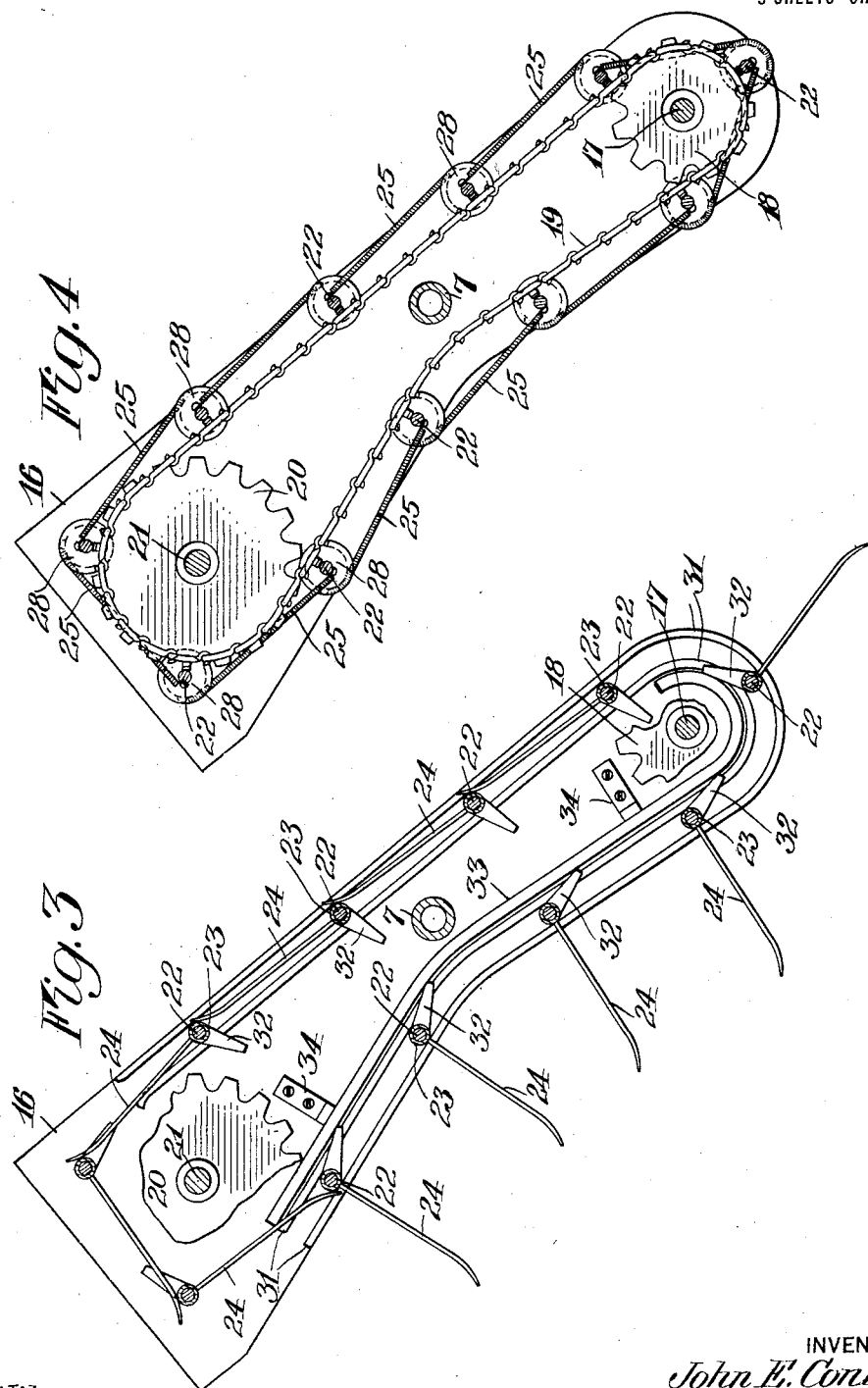

UNITED STATES PATENT OFFICE.

JOHN E. CONKLIN, OF TUSCARORA, NEW YORK.

VINE-LIFTING ATTACHMENT FOR HARVESTING-MACHINES.

1,388,407.  Specification of Letters Patent.  Patented Aug. 23, 1921.

Application filed January 8, 1919. Serial No. 270,103.

*To all whom it may concern:*

Be it known that I, JOHN E. CONKLIN, of Tuscarora, in the county of Livingston and State of New York, have invented certain new and useful Improvements in Vine-Lifting Attachments for Harvesting-Machines; and I do hereby declare the following to be a full, clear, and exact description of the same, reference being had to the accompanying drawings, forming a part of this specification, and to the reference-numerals marked thereon.

The object of my invention is to provide a vine lifting attachment for harvesting machines which is simple in construction, economical to manufacture and efficient in operation. A further object of my invention is to provide a vine lifting attachment for harvesting machines which can be readily attached to existing forms of machines and readily removed therefrom when not desired for use. More specifically the object of my invention is to provide a vine lifting attachment comprising a frame in which an endless carrier is adapted to move a plurality of vine lifting devices successively into engagement with the vines to be cut and which is adapted to lift the vines over the cutting bar during the cutting operation. A still further object of my invention is to provide a vine lifting attachment comprising a frame on which a plurality of vine lifting devices are movable, said devices being normally retracted to an inoperative position within said frame but adapted to be projected therefrom to an operative position. To these and other ends my invention resides in certain improvements and combinations of parts all as will be hereinafter more fully described, the novel features being pointed out in claims at the end of the specification.

In the drawings:

Figure 1 is a side elevation of a harvesting machine with my improved attachment applied thereto.

Fig. 2 is a plan view of the same.

Fig. 3 is a sectional view on the line 3ª—3ª of Fig. 2 showing the devices for controlling the position of the vine lifting devices.

Fig. 4 is a view similar to Fig. 3 but on the line 4ª—4ª of Fig. 2 showing one of the carriers and some of the parts connected thereto.

Fig. 5 is a sectional view on the line 5ª—5ª of Fig. 2 showing the supporting shaft and the parts carried thereby.

Fig. 6 is a transverse sectional view through the carrier mechanism on the line 6ª—6ª of Fig. 2 and Fig. 7 is a detailed sectional view on the line 7ª—7ª of Fig. 2 showing the bracket for supporting the carrier shaft.

My improved vine lifting attachment comprises a frame adapted to be supported on the frame of a harvesting machine and comprises further a pair of endless carriers on said frame adapted to be driven by the mechanism of the machine and carrying a plurality of shafts upon which are rotatably supported sleeves carrying the vine lifting devices which engage and support the vines during the cutting operation. I have shown my attachment applied to a mowing machine which comprises a pair of wheels 1, on which the machine is supported, and a shaft 2 adapted to be driven by the wheels. Forwardly of the wheels and to the side thereof is a cutting bar 3, for cutting grass or other material for which the machine is used. Suitably connected with the machine is a draft pole 4. A bracket or support 5, is suitably secured to the pole 4, as by bolts and has up-bent ears 6 at its ends in which a shaft 7 is supported to extend across the front of the machine. Braces 8 and 9 may connect the shaft 7 with the shaft 2 of the machine. Supported on the shaft 2 adjacent to the wheel 1 is a sprocket wheel 10 which is connected with the sprocket wheel 11 on the shaft 7, by means of the endless chain 12. The sprocket wheel 11 is rotatably supported on the shaft 7 and has a sprocket wheel 13 formed integral therewith.

Supported on the shaft 7 and fixed thereto are a pair of spaced plates or side members 16 which extend upwardly and rearwardly from a point forwardly and slightly above the cutting bar of the machine and form a frame in which the vine lifting devices are operated. Near the lower forward ends of the members 16 is rotatably supported therein a shaft 17 upon which a sprocket wheel 15 is secured outside the adjacent member 16 and is operatively connected with the sprocket wheel 13 by the endless chain 14. Adjacent the inner sides of the members 16 and between the same, shaft 17 has a pair of sprocket wheels 18 secured thereto which are connected by means of endless carriers in the form of sprocket chains 19 with a pair of sprocket wheels 20 mounted on a shaft 21 adjacent to the rear upper ends of the members 16. Rods or shafts 22 are secured at intervals to the chains 19 and are provided with enlarged bearing members 30 at their ends which engage guideways 31 provided on the inner faces of the frame members 16. Journaled on each of the shafts 22 is a vine lifting device each of which comprises a sleeve 23 rotatably carried on the shaft and secured in one side of the sleeve in spaced relation to each other and projecting therefrom are a plurality of spring tines or prongs 24. At one end each of the sleeves 23 has a circular disk 28 secured thereto having a grooved periphery, as clearly indicated in Fig. 6 of the drawings. A contractile spring 25 has one end secured in the groove of the disk 28 and the other end anchored to the next adjacent shaft 22. The springs 25 operate to move and normally retain the vine lifting devices in an inoperative position in which the tines 24 are retracted within the frame. Means are provided for automatically projecting the vine lifting devices and maintaining them in projected operative position as they approach and move past the cutting bar of the machine. Said means comprises an arm or projection 32 on the end of the sleeve 23 adapted to engage a cam bar or guide 33 supported on brackets 34 secured to one of the frame members 16 and projecting therefrom over the adjacent carrier 19. The guide 33 extends from a point adjacent the lower forward end of the frame around the lower end and rear side thereof substantially parallel with the guide way 31. The guideway 31 is continuous except that it is broken away for a short distance near the upper end of the frame where the carriers are in engagement with the sprocket wheels 20, and serves to guide the shafts 22 in their path of movement on the frame and prevent displacement thereof due to strains applied to the vine lifting devices in the operation thereof. When the arms 32 of the vine lifting devices engage the end of the guide 33, the vine lifting devices are moved against the tension of their springs to operative position in which the tines 24 are projected in position to engage and lift the vines during the cutting operation. When the arms reach the rear end of the guide the springs 25 again retract the vine lifting devices to inoperative position.

When the machine is drawn the sprocket wheel 10 is rotated and motion is transmitted to the carriers 19 through the chain 12, wheels 11 and 13, chain 14 and shaft 17.

I claim as my invention:

1. The combination with a harvesting machine, of a frame, means for supporting said frame in operative relation to the cutting bar of said machine, a plurality of flexible carriers movable on said frame, a plurality of shafts spaced from each other and connected to said carriers, means on the frame for guiding said shafts, a vine lifting device journaled on each of said shafts, a guide mounted on said frame, an arm on each of said vine lifting devices coöperating with said guide for controlling the operative position of said vine lifting devices, and a spring connecting each of said vine lifting devices with the next adjacent shaft and adapted to maintain said arm in coöperative relation with said guide.

2. The combination with a harvesting machine, of a frame, means for supporting said frame in operative relation to the cutting bar of said machine, a plurality of flexible carriers movable on said frame, a plurality of vine lifting devices connected to said carriers each comprising a plurality of vine engaging tines, springs connected to said vine lifting devices and normally maintaining said tines in retracted position, and means adapted to be engaged by said vine lifting devices for projecting said tines to an operative position.

3. The combination with a harvesting machine, of a frame, means for supporting said frame in operative relation to the cutting bar of said machine, a plurality of flexible carriers movable on said frame, a plurality of vine lifting devices connected to said carriers and each comprising a plurality of vine engaging tines, springs connected to said vine lifting devices and normally maintaining said tines retracted within said frame, and means on the frame adapted to be engaged by said vine lifting devices at a predetermined point in their path of movement and operative to move them to project the tines from the frame.

4. The combination with a harvesting machine of a frame supported above the cutting bar thereof, flexible carriers movably supported on said frame, vine lifting devices movably supported on said carriers, guiding means on the frame for said carriers, actuating means for said carriers adapted in conjunction with said guiding means to move said devices rearwardly at a rate substantially equal to the forward movement of said machine and also upwardly so as to impart to said devices a substantially vertical movement with respect to the vines, and controlling means for collapsing said devices in a direction opposite that of the movement of said carriers for depositing the cut vines in rear of the cutting bar.

5. The combination with a harvesting machine of a frame supported above the cutting bar thereof, flexible carriers movably supported on said frame, vine lifting devices movably supported on said carriers, actuating means for said carriers, guiding means for said carriers adapted in conjunction with said actuating means to impart to said devices a substantially vertical movement with respect to the vines, additional guiding means for the carriers for subsequently tilting said devices vertically and moving them rearwardly over said bar, and controlling means for collapsing said devices in a direction opposite that of the movement of the carriers for depositing the cut vines in rear of the bar.

6. The combination with a harvesting machine of a frame supported above the cutting bar thereof guiding means on said frame, spaced flexible carriers connected by cross members extending outside the carriers and engaging said guiding means, a sleeve rotatable on each cross member, a plurality of vine lifting tines on each sleeve, actuating means for said carriers, and controlling means for rotating said sleeves to advance said tines to raise the vines and to subsequently collapse said tines in a direction opposite the movement of the carriers to deposit the cut vines in rear of said bar.

7. The combination with a harvesting machine of a frame supported above the cutting bar thereof, guiding means on said frame, spaced flexible carriers connected by cross members extending outside the carriers and engaging said guiding means, a plurality of vine lifting tines on each cross member, actuating means for said carriers, springs for normally maintaining said tines in retracted position, and controlling means for advancing said tines from said carriers to raise the vines and for subsequently permitting said tines to be retracted in a direction opposite the movement of said carriers to deposit the cut vines in rear of said bar.

JOHN E. CONKLIN.